(No Model.)
N. T. SCOTT.
NUT LOCK.
No. 406,150. Patented July 2, 1889.
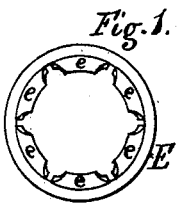
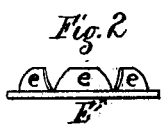
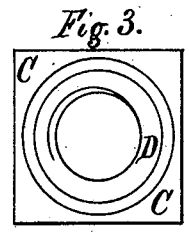
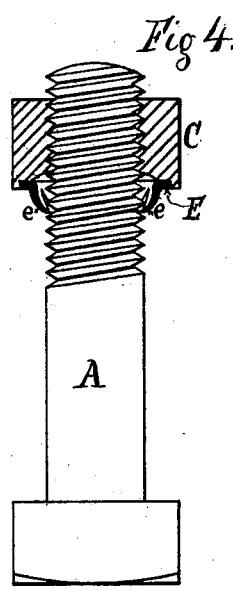
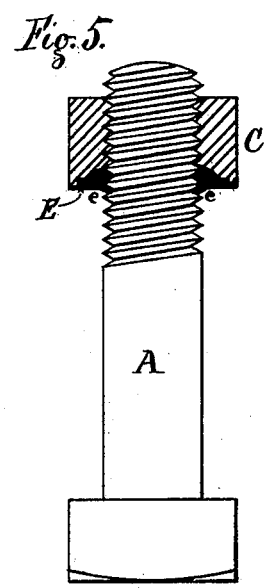
WITNESSES:
W<sup>m</sup> H. Weightman
C. H. Washburn
INVENTOR
N. T. Scott.
BY A. M. Pierce
ATTORNEY

UNITED STATES PATENT OFFICE.

NELSON T. SCOTT, OF NEW YORK, N. Y.

NUT-LOCK.

SPECIFICATION forming part of Letters Patent No. 406,150, dated July 2, 1889.

Application filed July 29, 1886. Renewed December 11, 1888. Serial No. 293,325. (No model.)

*To all whom it may concern:*

Be it known that I, NELSON T. SCOTT, a citizen of the United States, and a resident of New York, in the county of New York and State of New York, have invented certain new and useful Improvements in Nut-Locks, of which the following is a specification.

My invention relates especially to devices employed for securing nuts in place when screwed home upon bolts, and has for its object the provision of a device cheap and simple to construct, easy to apply, effective in operation, and which will not injure the thread of the bolt or nut wherewith it is employed.

To attain the desired end my invention consists, essentially, in a nut having a concave recess in its inner face, wherein a toothed metallic washer is seated, the teeth of said washer being adapted and arranged to enter and grip the threads of the bolt when the nut is screwed home. The concave recess is for the double purpose of holding the toothed washer in place and to take up the surplus length (if any) of said teeth, so as to allow the nut to close down tightly to the matter bolted, all of which will be hereinafter first fully described, and then pointed out in the claim.

In the drawings, Figure 1 is a plan view of the washer, and Fig. 2 an elevation thereof. Fig. 3 is a view of the inner face of the nut. Fig. 4 is a longitudinal sectional view of the parts assembled upon the bolt before screwing home, and Fig. 5 is a like view with the parts in the position they occupy when the nut is locked.

Like letters of reference wherever they occur indicate corresponding parts in all the figures.

A is the body of the bolt, made in any approved manner with any sized thread.

C is an ordinary nut, made to fit the bolt A, but provided with a recess D in its inner face.

E is a washer or plate, made of sheet metal stamped or struck up, as indicated particularly in Figs. 1 and 2, and provided with teeth *e*. The rim of washer E fits into the concave recess D in the nut C and points toward the head of the bolt when placed in position for use.

When the parts are assembled and the nut is screwed home, the rim of the washer is pressed into the concave recess D in the nut, and the teeth *e* are forced downward and inward into the threads of the bolt. As the plane of the washer is at right angles to the axis of the bolt, and as the threads are at an angle thereto, it is plain to be seen that the teeth *e* embrace a number of threads, and are also forced to cross one or more, firmly and securely locking the nut in place in such a manner that no jar can start it, but a wrench must be forcibly applied for its removal. When once removed after locking, the cheap and simple washer E may be thrown away and a new one substituted therefor. Thus the bolt and nut may be used again and again until worn out, and the threads will not be destroyed or injured by the washer.

Having now fully described my invention, what I claim as new therein, and desire to secure by Letters Patent, is—

The combination, with a screw-threaded bolt, of a nut having a shouldered recess in its inner face and a conical washer projecting originally beyond the face of the nut and having a toothed inner edge and a flange at its base fitting the recess in the nut, whereby, when the nut is screwed home, the washer is forced into the recess, so as become practically integral with the nut and bolt, substantially as shown and described.

Signed at New York, in the county of New York and State of New York, this 28th day of July, A. D. 1886.

NELSON T. SCOTT.

Witnesses:
W. J. MORGAN,
A. M. PIERCE.